(12) United States Patent
Jeong et al.

(10) Patent No.: US 9,075,242 B2
(45) Date of Patent: Jul. 7, 2015

(54) IMAGE DISPLAY DEVICE USING DIFFRACTIVE LENS

(71) Applicant: Samsung Display Co., Ltd., Yongin (KR)

(72) Inventors: Seung Jun Jeong, Asan-si (KR); Kyung-Ho Jung, Yongin-si (KR); Seung-Hoon Lee, Hwaseong-si (KR); Hee-Seop Kim, Hwaseong-si (KR); Hae-Young Yun, Suwon-si (KR); Hwi Kim, Seoul (KR); Il-Joo Kim, Incheon Metropolitan (KR); Kyung-Bae Kim, Yongin-si (KR); Jung-Hwan Yi, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/293,501

(22) Filed: Jun. 2, 2014

(65) Prior Publication Data

US 2014/0267961 A1 Sep. 18, 2014

Related U.S. Application Data

(63) Continuation of application No. 12/903,586, filed on Oct. 13, 2010, now Pat. No. 8,988,649.

(30) Foreign Application Priority Data

Mar. 17, 2010 (KR) ........................ 10-2010-0023752

(51) Int. Cl.
*G02F 1/13* (2006.01)
*G02F 1/1335* (2006.01)
(Continued)

(52) U.S. Cl.
CPC .......... *G02B 27/2214* (2013.01); *G02B 5/1842* (2013.01); *G02B 5/1876* (2013.01);
(Continued)

(58) Field of Classification Search
CPC .............................. G02F 1/292; G02B 5/1876
USPC ............................................ 349/15, 201, 202
See application file for complete search history.

(56) References Cited

U.S. PATENT DOCUMENTS

2006/0164593 A1 7/2006 Peyghambarian et al.
2006/0273284 A1 12/2006 Hirose
(Continued)

FOREIGN PATENT DOCUMENTS

CN 101419352 4/2009
CN 101889240 11/2010
(Continued)

OTHER PUBLICATIONS

Non-Final Office Action dated Feb. 5, 2013 in U.S. Appl. No. 12/903,586.
(Continued)

*Primary Examiner* — Paul Lee
(74) *Attorney, Agent, or Firm* — H.C. Park & Associates, PLC (57) ABSTRACT

The present invention relates to an image display device using a diffractive lens. An image display device according to an exemplary embodiment of the present invention includes a display panel displaying an image, and a diffractive lens for the image of the display panel to be recognized as a two-dimensional (2D) image or a three-dimensional (3D) image, wherein the diffractive lens modifies a path of light by using an optical principle of a Fresnel zone plate.

44 Claims, 10 Drawing Sheets (51) Int. Cl.

| | | |
|---|---|---|
| *G02B 27/22* | (2006.01) | |
| *G02B 5/18* | (2006.01) | |
| *G02B 27/26* | (2006.01) | |
| *G02F 1/1343* | (2006.01) | |
| *H04N 13/04* | (2006.01) | |
| *G02F 1/29* | (2006.01) | |

(52) U.S. Cl.
CPC ........ *G02B27/2242* (2013.01); *G02B 27/2264* (2013.01); *G02B 27/26* (2013.01); *G02F 1/134309* (2013.01); *G02F 1/134363* (2013.01); *G02F 2001/294* (2013.01); *H04N 13/0404* (2013.01); *H04N 13/0452* (2013.01); *G02F 1/29* (2013.01); *G02F 1/292* (2013.01)

(56) References Cited

U.S. PATENT DOCUMENTS

| | | |
|---|---|---|
| 2008/0278640 A1 | 11/2008 | Ijzerman et al. |
| 2008/0316597 A1 | 12/2008 | Tsai et al. |
| 2009/0122210 A1* | 5/2009 | Im ................................... 349/15 |
| 2010/0026920 A1 | 2/2010 | Kim et al. |

FOREIGN PATENT DOCUMENTS

| | | |
|---|---|---|
| JP | 05-100201 | 4/1993 |
| JP | 09-203980 | 8/1997 |
| JP | 10-150676 | 6/1998 |
| JP | 2002-010298 | 1/2002 |
| JP | 2002-084553 | 3/2002 |
| JP | 2002-156603 | 5/2002 |
| JP | 2005-091445 | 4/2005 |
| JP | 2008-529064 | 7/2008 |
| JP | 2009-058767 | 3/2009 |
| JP | 2009-104137 | 5/2009 |
| JP | 2011-164527 | 8/2011 |
| KR | 10-2006-0078051 | 7/2006 |
| KR | 10-2008-0057883 | 6/2008 |
| KR | 10-2008-0092625 | 10/2008 |
| KR | 10-2008-0114310 | 12/2008 |
| KR | 1020080105549 | 12/2008 |
| KR | 10-2009-0065934 | 6/2009 |
| WO | 2009-072670 | 6/2009 |

OTHER PUBLICATIONS

Non-Final Office Action dated Aug. 13, 2013 in U.S. Appl. No. 12/903,586.

Notice of Allowance dated Feb. 4, 2014 in U.S. Appl. No. 12/903,586.

Supplemental Notice of Allowance dated Apr. 10, 2014 in U.S. Appl. No. 12/903,586.

Notice of Allowance issued on Oct. 31, 2014, in U.S. Appl. No. 12/903,586.

Non-Final Office Action dated Jul. 24, 2014 for U.S. Appl. No. 12/903,586.

* cited by examiner

Amplitude modulation type Fresnel

FIG. 4

Phase modulation type Fresnel

IMAGE DISPLAY DEVICE USING DIFFRACTIVE LENS

CROSS-REFERENCE TO RELATED APPLICATION

The present application is a continuation of U.S. patent application Ser. No. 12/903,586, filed on Oct. 13, 2010, issued as U.S. Pat. No. 8,755,024 on Jun. 17, 2014, and claims priority from and the benefit of Korean Patent Application No. 10-2010-0023752, filed on Mar. 17, 2010, each of which is hereby incorporated by reference for all purposes as if fully set forth herein.

BACKGROUND OF THE INVENTION

1. Field of the Invention

The present invention relates to an image display device using a diffractive lens, and in detail relates to a two-dimensional/three-dimensional (2D/3D) compatible image display device.

2. Discussion of the Background

In recent years, display device technologies have been remarkably developed such that a three-dimensional (3D) stereoscopic image display device has been attained, and various methods for displaying 3D images have been researched.

To realize the stereoscopic image display, one of the most generally-used methods is one using binocular parallax. In the method using binocular parallax, an image arriving at the left eye and an image arriving at the right eye are displayed in the same display device, and the two images are respectively incident to the left eye and the right eye of an observer. That is, images that are respectively observed at different angles are input to both eyes such that the observer may perceive a three-dimensional effect.

Methods in which the images are respectively input to the right and left eyes include a method using a barrier and a method using a lenticular lens as one type of cylindrical lens.

In a stereoscopic image display device using the barrier, a slit is formed in the barrier, and the images from the display device is divided into a left eye image and a right eye image that are respectively input to the left and right eyes of the observer through the slit.

A stereoscopic image display device using the lens respectively displays the left eye image and the right eye image, and the light path of the images from the stereoscopic image display device is modified through the lens such that the images are divided into the left eye image and the right eye image.

On the other hand, in a process in which a plane image display method is converted into a stereoscopic image display method, a 2D/3D compatible image display device has been developed, and the capability of switching between two-dimensional (2D) and 3D has is been developed.

The above information disclosed in this Background section is only for enhancement of understanding of the background of the invention and therefore it may contain information that does not form any part of the prior art.

SUMMARY OF THE INVENTION

Exemplary embodiments of the present invention provide an image display device using a diffractive lens.

Exemplary embodiments of the present invention also provide a method for driving an image display device including a diffractive lens.

Additional features of the invention will be set forth in the description which follows, and in part will be apparent from the description, or may be learned by practice of the invention.

An exemplary embodiment of the present invention discloses an image display device that includes a display panel to display an image and a diffractive lens for the image of the display panel to be recognized as a 2D image or a 3D image, wherein the diffractive lens modifies a path of light by using an optical principle of a Fresnel zone plate.

An exemplary embodiment of the present invention also discloses a method for driving an image display device including a display panel, a diffractive lens for an image of the display panel to be recognized as a 2D image or a 3D image, and a controller for controlling the display panel and the diffractive lens. The method includes inputting one of a 2D image signal and a 3D image signal from an external storage unit to the controller; generating a first control signal to control a display mode of the display panel in the controller and to be provided to the display panel, and generating a second control signal to control switching of the diffractive lens on and off in the controller and to be provided to the diffractive lens, wherein the diffractive lens modifies a path of light from the display panel by using an optical principle of a Fresnel zone plate.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the size and relative sizes of layers, films, panels, regions, etc., may be exaggerated for clarity. Like reference numerals designate like elements throughout the specification. It will be understood that when an element such as a layer, film, region, or substrate is referred to as being "on" or "connected to" another element, it can be directly on or directly connected to the other element, or intervening elements may be present. In contrast, when an element is referred to as being "directly on" or "directly connected to" another element, there are no intervening elements present.

Figure 1:
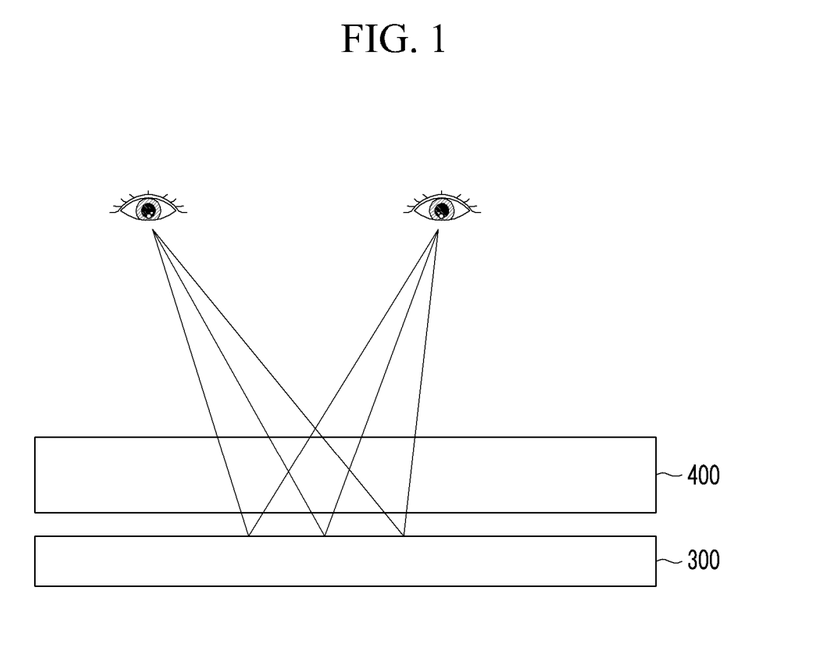
FIG. 1 and FIG. 2 are views showing a schematic structure of an image display device and a method of forming a 2D image and a 3D image according to an exemplary embodiment of the present invention.
Figure 2:
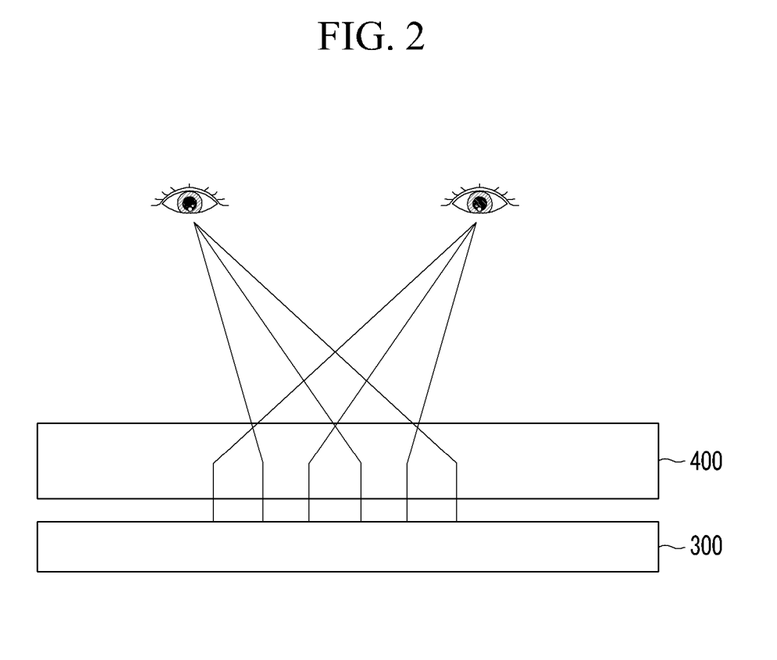

FIG. 1 and FIG. 2 are views showing a schematic structure of an image display device and a method of forming a 2D image and a 3D image according to an exemplary embodiment of the present invention.

Referring to FIG. 1 and FIG. 2, an image display device according to an exemplary embodiment of the present invention includes a display panel 300 displaying images, and a diffractive lens 400 positioned at a front side of the surface where the images of the display panel 300 are displayed.

The display panel 300 may be a flat panel display such as a plasma display panel (PDP), a liquid crystal display (LCD), and an organic light emitting device (OLED). The display panel 300 includes a plurality of pixels arranged in a matrix shape and displaying the images. The display panel 300 displays one plane image in a 2D mode, however it may alternately display images corresponding to several fields of vision such as a right eye image and a left eye image as a spatial or temporal division type in a 3D mode. For example, as a spatial division type in the 3D mode, the display panel 300 may alternately display the right eye image and the left eye image every other pixel column.

The diffractive lens 400 is capable of switching on/off to divide the vision field of the image displayed in the display panel 300 by using diffraction of the light. That is, the diffractive lens 400 refracts the image of the display panel 300 by using the diffraction of the light such that the image is formed at the corresponding vision field. The diffractive lens 400 is turned off when the display panel 300 is in the 2D mode, and is turned on when it is in the 3D mode thereby having a function of dividing the vision field of the image of the display panel 300. Also, the diffractive lens 400 may be turned off when the display panel 300 is in the 3D mode, and may be turned on when it is in the 2D mode.

FIG. 1 shows that the same image arrives at the left eye and the right eye when the diffractive lens 400 is turned off such that the 2D image is recognized, and FIG. 2 shows that the diffractive lens 400 is turned on such that the image of the display panel 300 is divided into each vision field such as the left eye and right eye and refracted, such that the 3D image is recognized.

The diffractive lens 400 may be realized through a Fresnel zone plate. The Fresnel zone plate is a device generally using a plurality of concentric circles arranged in a radial manner like a Fresnel zone and having intervals decreasing from the center to the outer side. The Fresnel zone plate functions as a lens using diffraction of light instead of refraction of light.

Kinds of the Fresnel zone plates according to optical characteristics will be described with reference to FIG. 3 and FIG. 4.

Figure 3:
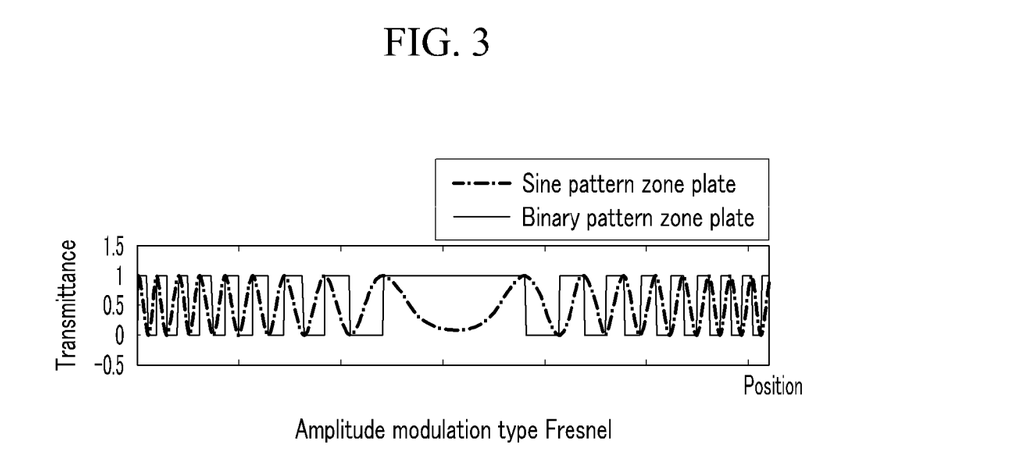
FIG. 3 is a graph showing a transmittance change according to a position of a Fresnel zone plate of an amplitude modulation type.
Figure 4:
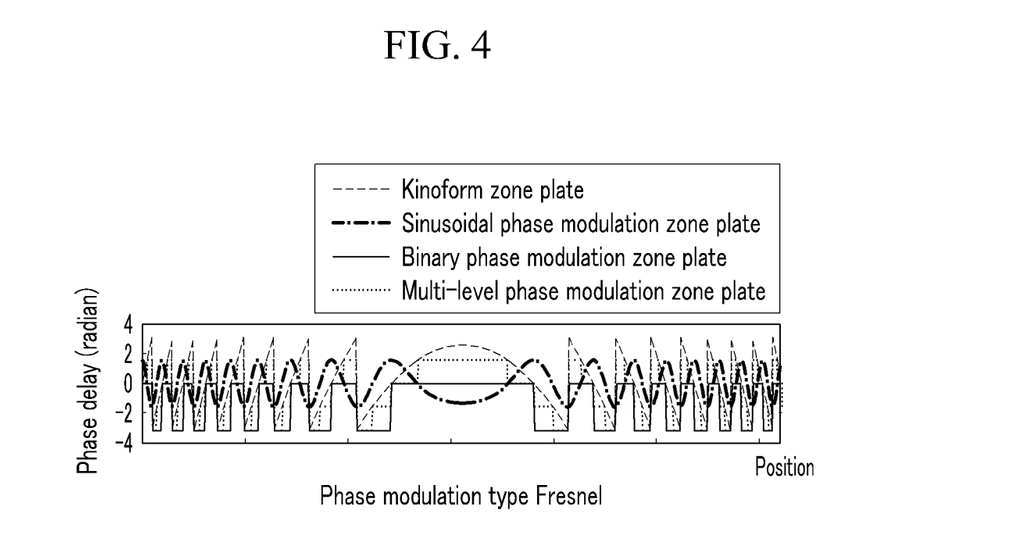
FIG. 4 is a graph showing a phase delay change according to a position of a Fresnel zone plate of a phase modulation type.

FIG. 3 is a graph showing a transmittance change according to a position of a Fresnel zone plate of an amplitude modulation type, and FIG. 4 is a graph showing a phase delay change according to a position of a Fresnel zone plate of a phase modulation type. Here, each zone of the Fresnel zone plate is a region in which the respective repeated waveform is included in each graph.

Referring to FIG. 3, a Fresnel zone plate of an amplitude modulation type includes a sine pattern zone plate of which the transmittance of the light in each zone is changed between 0 and 1 with a sine pattern according to the position and a binary pattern zone plate in which each zone is divided into two portions where the transmittances of the light are 1 and 0, and so forth.

Referring to FIG. 4, the Fresnel zone plate of a phase modulation type includes a kinoform zone plate, a sinusoidal phase modulation zone plate, a binary phase modulation zone plate, and a multi-level phase modulation zone plate, and so forth. The kinoform zone plate represents the same phase delay as the Fresnel lens in each zone, and in the sinusoidal phase modulation zone plate, the phase change in each zone is changed with a sine curved line. In the binary phase modulation zone plate, each zone is divided into two portions where the phase delays are 0 radians and $-\pi$ radians, and in the multi-level phase modulation zone plate, the phase delay in each zone is changed into a stepwise shape. In FIG. 4, the phase delay in each zone is changed through four steps in the multi-level phase modulation zone plate.

Comparing intensity of light (not shown) at the focal distance of each zone plate, the diffractive efficiency of the Fresnel zone plate of the phase modulation type is good compared with the Fresnel zone plate of the amplitude modulation type. Among the Fresnel zone plates of the phase modulation type, the diffractive efficiency of the multi-level phase modulation zone plate is next best to the kinoform zone plate, and thereby the intensity of light is strongest at the focal distance. Accordingly, the following exemplary embodiment is described while focusing on the multi-level phase modulation zone plate, but is not limited thereto.

Here, a liquid crystal diffractive lens according to an exemplary embodiment of the present invention will be described with reference to FIG. 5.

Figure 5:
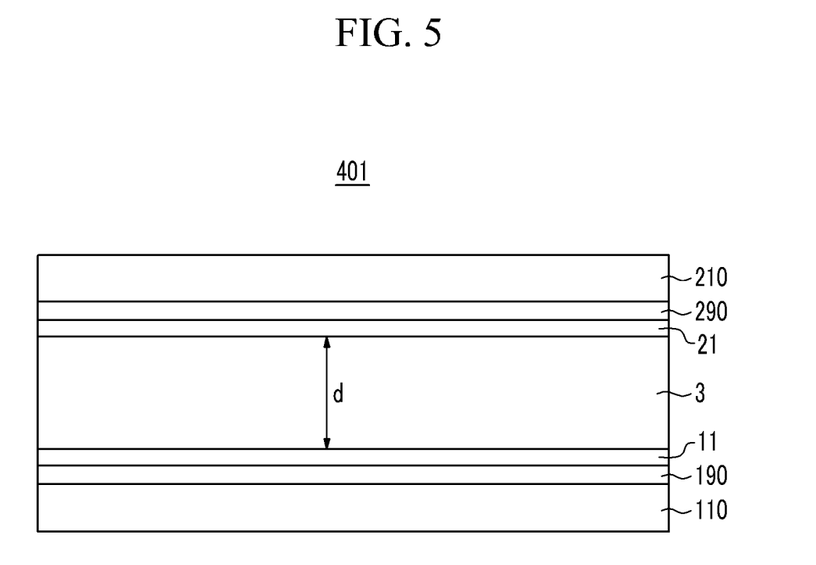
FIG. 5 is a cross-sectional view of a liquid crystal diffractive lens as one example of a diffractive lens according to an exemplary embodiment of the present invention.

FIG. 5 is a cross-sectional view of a liquid crystal diffractive lens as one example of a diffractive lens according to an exemplary embodiment of the present invention.

The liquid crystal diffractive lens 401 according to the present exemplary embodiment as one example of the diffractive lens 400 described in the exemplary embodiment of FIG. 1 and FIG. 2 is a diffractive lens using a liquid crystal. A liquid crystal diffractive lens 401 according to the present exemplary embodiment includes a first substrate 110 and a second substrate 210 made of an insulating material such as glass or plastic and facing each other, and a liquid crystal layer 3 interposed between the two substrates 110 and 210.

A first electrode layer 190 and a first alignment layer 11 are sequentially formed on the first substrate 110, and a second electrode layer 290 and a second alignment layer 21 are sequentially formed on the second substrate 210.

The first electrode layer 190 and the second electrode layer 290 include a plurality of electrodes made of a transparent conductive material such as indium tin oxide (ITO) or indium zinc oxide (IZO). The first electrode layer 190 and the second electrode layer 290 form an electric field in the liquid crystal layer 3 according to an applied voltage, thereby controlling the arrangement of liquid crystal molecules of the liquid crystal layer 3.

The alignment layers 11 and 21 determine the initial alignment of the liquid crystal molecules of the liquid crystal layer 3, and thereby the arrangement direction of the liquid crystal molecules is previously determined such that they are quickly arranged according to the electric field formed in the liquid crystal layer 3.

The liquid crystal layer 3 may be aligned in various modes such as a horizontal alignment mode and a vertical alignment (VA) mode, and the long axis direction of the liquid crystal molecules may not be twisted from the first substrate 110 to the second substrate 210 in the initial alignment state.

The liquid crystal diffractive lens 401 according to the present exemplary embodiment is turned off and is not operated when the voltage is not applied to the first electrode layer 190 and the second electrode layer 290, and then if the voltage is applied to the first electrode layer 190 and the second electrode layer 290, the liquid crystal layer 3 is aligned, and the liquid crystal diffractive lens 401 operates as the above-described Fresnel zone plate, thereby refracting the light and executing the function of the lens.

One exemplary embodiment of the liquid crystal diffractive lens will be described with reference to FIG. 6, FIG. 7, FIG. 8 and FIG. 9 as well as FIG. 5. Like reference numerals designate the same constituent elements as the exemplary embodiment of FIG. 5, and the same descriptions will be omitted.

Figure 6:
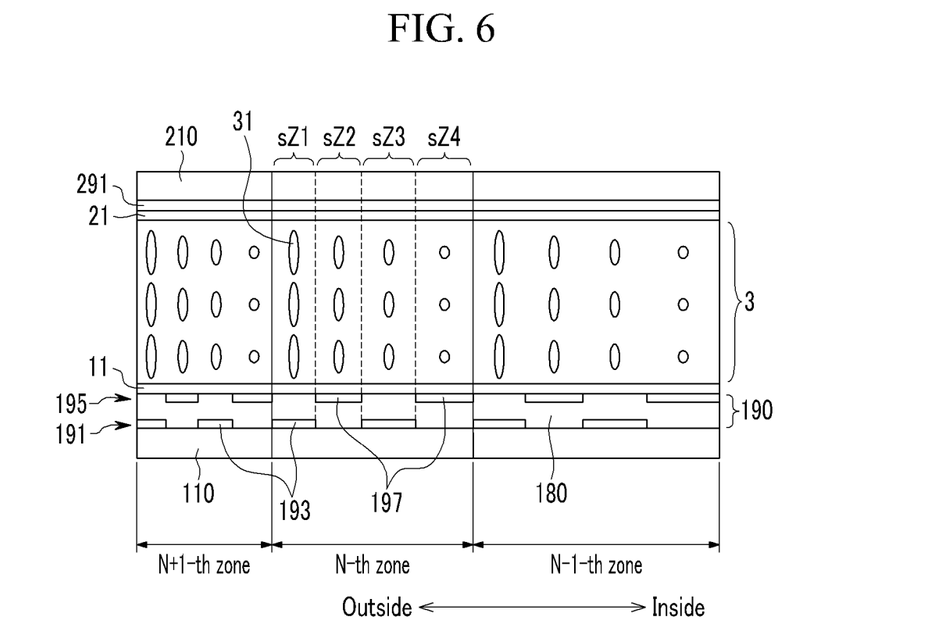
FIG. 6 is a cross-sectional view of a liquid crystal diffractive lens according to an exemplary embodiment of the present invention.
Figure 7:
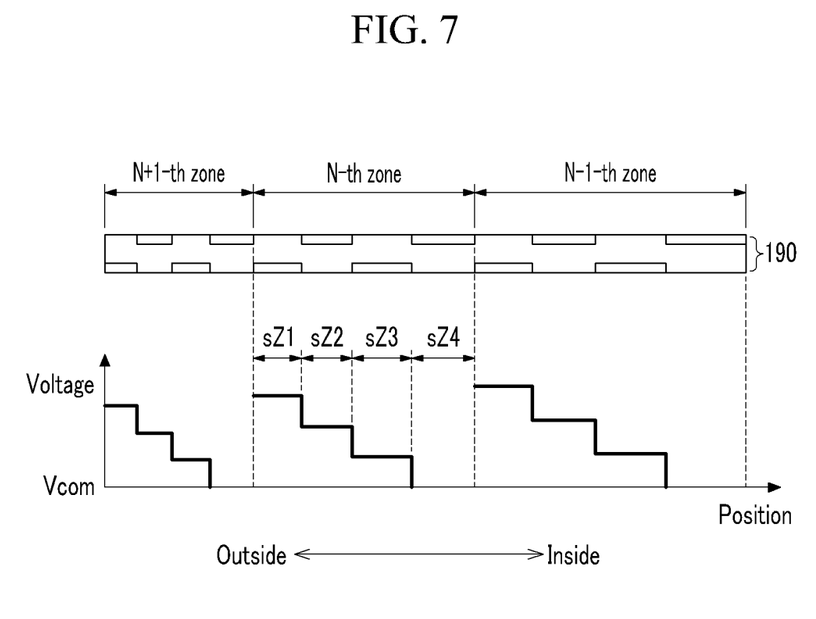
FIG. 7 is a view showing a voltage applied to an electrode of the liquid crystal diffractive lens of FIG. 6.
Figure 8:
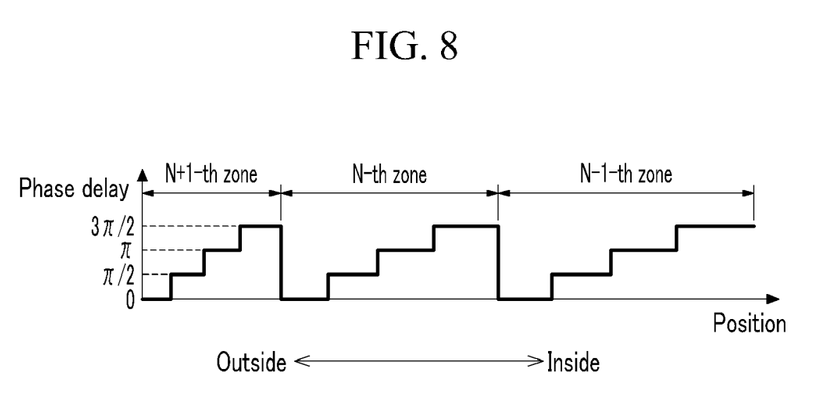
FIG. 8 is a view showing a phase delay in each zone of the liquid crystal diffractive lens of FIG. 6.
Figure 9:
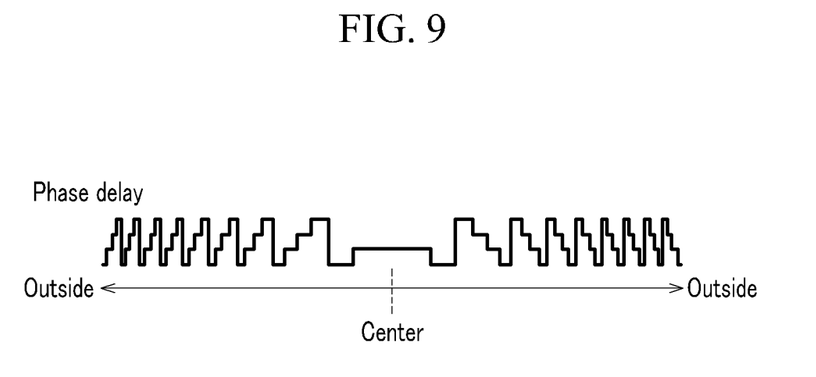
FIG. 9 is a view showing a phase delay shape included in one cycle of the liquid crystal diffractive lens of FIG. 6.

FIG. 6 is a cross-sectional view of a liquid crystal diffractive lens according to an exemplary embodiment of the present invention, FIG. 7 is a view showing a voltage applied to an electrode of the liquid crystal diffractive lens of FIG. 6, FIG. 8 is a view showing a phase delay in each zone of the liquid crystal diffractive lens of FIG. 6, and FIG. 9 is a view showing a phase delay shape included in one cycle of the liquid crystal diffractive lens of FIG. 6.

Referring to FIG. 6, a liquid crystal diffractive lens according to the present exemplary embodiment includes a first substrate 110 and a second substrate 210 facing each other, and a liquid crystal layer 3 interposed between two substrates 110 and 210. A first electrode layer 190 and an alignment layer 11 are sequentially formed on the first substrate 110, and a second electrode layer 290 (FIG. 5) and an alignment layer 21 are sequentially formed on the second substrate 210.

The first electrode layer 190 includes a first electrode array 191 including a plurality of first electrodes 193, an insulating layer 180 formed on the first electrode array 191, and a second electrode array 195 formed on the insulating layer 180 and including a plurality of second electrodes 197.

The first electrodes 193 and the second electrodes 197 may be alternately disposed in the transverse direction and may not be overlapped with each other. In FIG. 6, the edges of the first electrode 193 and the second electrode 197 are not overlapped, however portions of the edges may be overlapped with each other.

When the side where the center of the Fresnel zone plate is positioned is referred to as an inner side (inside), horizontal directional widths of the first electrode 193 and the second electrode 197 or an interval between the first electrodes 193 and between the second electrodes 197 is decreased closer to the outer side (outside). In each zone of the zone plate such as the (n−1)-th zone, the n-th zone, and the (n+1)-th zone, two first electrodes 193 and two second electrodes 197 are positioned, and the region where each of the electrodes 193 and 197 is positioned in each zone forms a sub-zone sZ1, sZ2, sZ3, and sZ4. In one zone, sZ1, sZ2, sZ3, and sZ4 sequentially indicate the sub-zones disposed from outside to inside. In FIG. 6, one zone is drawn to include four sub-zones sZ1, sZ2, sZ3, and sZ4, however the number of the sub-zones included in one zone is not limited thereto. As shown in FIG. 6, the horizontal directional widths of the electrodes 193 and 197 included in each zone may be decrease closer to an outer zone. Differently from FIG. 6, the horizontal directional widths of the first electrode 193 and the second electrode 197 included in one zone may be uniform.

For all zones, the horizontal directional widths of the first electrode 193 and the second electrode 197 may be greater than or equal to the cell gap d of the liquid crystal layer 3. Accordingly, the cell gap d of the liquid crystal layer 3 may be less than 10 μm, and in detail less is than 5 μm, such that the control of the liquid crystal molecule may be easier.

The insulating layer 180 may be an inorganic insulator or an organic insulator, thereby electrically insulating between the first electrode array 191 and the second electrode array 195.

A common electrode 291 is formed on the whole surface of the second substrate 210, and receives a predetermined voltage such as a common voltage Vcom. The common electrode 291 may be made of a transparent conductive material such as ITO and IZO.

The alignment layers 11 and 21 may be rubbed in a length direction (a direction normal to the surface of the view) perpendicular to the width direction of the first electrode 193 and the second electrode 197, or a predetermined direction for the length direction. The rubbing directions of the first alignment layer 11 and the second alignment layer 21 may be opposite to each other.

Liquid crystal molecules 31 of the liquid crystal layer 3 may be initially aligned in the direction parallel to the surface of the substrate 110 and 210, however the alignment of the liquid crystal layer 3 is not limited thereto and vertical alignment is possible.

An operation of the liquid crystal diffractive lens will now be described.

Referring to FIG. 6 and FIG. 7, the first electrode 193 and the second electrode 197 of each zone of the Fresnel zone plate are applied with voltages that vary with a step shape gradually increasing from the inside to the outside. For example, the second electrode 197 of the sub-zone sZ4 is applied with the common voltage Vcom, the first electrode 193 of the sub-zone sZ3 is applied with a voltage of a first level, the second electrode 197 of the sub-zone sZ2 is applied with a voltage of a second level greater than the first level, and the first electrode 193 of the sub-zone sZ1 is applied with a voltage of a third level greater than the second level. The first electrode 193 or the second electrode 197 of the same sub-zone in each zone is applied with a voltage so that they generate the same phase delay.

As described above, if the common electrode 291 is applied with the common voltage Vcom and the first electrode 193 and the second electrode 197 are applied with voltages as shown in FIG. 7, the liquid crystal molecules 31 of the liquid crystal layer 3 may be arranged as shown in FIG. 6. That is, in the case of the liquid crystal layer 3 in a horizontal alignment mode, the liquid crystal molecules 31 of the sub-zone sZ4 are maintained parallel to the surfaces of the substrates 110 and 210, while the liquid crystal molecules 31 of the liquid crystal layer 3 are arranged gradually perpendicular to the surfaces of the substrates 110 and 210 from the sub-zone sZ3 to the sub-zone sZ1. However, when the liquid crystal layer 3 is in a different mode from the horizontal alignment, the liquid crystal molecules may be differently arranged.

As shown in FIG. 8, the value of the phase delay of the liquid crystal layer 3 in the sub-zones sZ1, sZ2, sZ3, and sZ4 may be varied by the arrangement variation of the liquid crystal molecules 31 of the liquid crystal layer 3 in the sub-zones sZ1, sZ2, sZ3, and sZ4. That is, the value of the phase delay may be gradually increased with the step shape closer to the inside in each zone of the Fresnel zone plate, thereby realizing a zone plate of multi-level phase modulation as described above. In the present exemplary embodiment, as the value of the voltage applied to the first electrode 193 or the second electrode 197 is increased, the phase delay is decreased. However, a liquid crystal layer 3 may be selected so that the phase delay may be increased as the value of the voltage applied to the first electrode 193 or the second electrode 197 is increased.

As described above, the phase delay of the liquid crystal layer 3 is varied to the multi-levels by controlling the voltages applied to the common electrode 291, the first electrode 193, and the second electrode 197 such that the Fresnel zone plate of the phase modulation may be realized in each zone, and the light may be refracted to be gathered at the focal position through diffraction, extinction, and constructive interference of the light passing through each zone. FIG. 9 is a view showing one phase modulation Fresnel zone plate realized by using a liquid crystal diffractive lens according to an exemplary embodiment of the present invention.

If the voltages applied to the first electrode 193 and the second electrode 197 are equal to each other, the liquid crystal layer 3 does not operate as a diffractive lens, and the 2D image of the display panel 300 may be recognized in the left eye and the right eye.

According to the present exemplary embodiment, the cell gap d of the liquid crystal layer 3 included in the liquid crystal diffractive lens may be remarkably reduced such that the control of the liquid crystal molecules 31 may be easier, and the surfaces of the first substrate 110 and the second substrate 210 contacting the liquid crystal layer 3 is substantially flat such that the uniformity of the alignment of the liquid crystal layer 3 may be improved. Also, the thickness of the diffractive lens may be remarkably reduced by using the principle of the Fresnel zone plate, and in the case of the liquid crystal diffractive lens, the cell gap of the liquid crystal layer may be further reduced such that the productivity of the diffractive lens used in the image display device may be improved.

Next, a liquid crystal diffractive lens according to another exemplary embodiment of the present invention will be described with reference to FIG. 10 as well as FIG. 5, FIG. 6, FIG. 7, FIG. 8 and FIG. 9. Like reference numerals designate like elements in the embodiment, and the same descriptions will be omitted.

Figure 10:
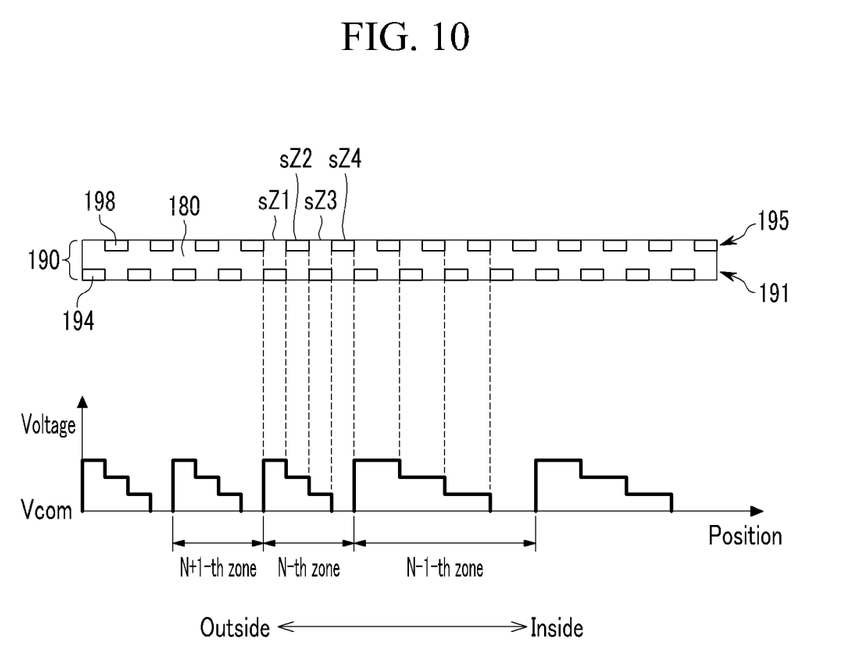
FIG. 10 is a cross-sectional view of a portion of a liquid crystal diffractive lens according to an exemplary embodiment of the present invention and a view showing a voltage applied to an electrode of a liquid crystal diffractive lens.

FIG. 10 is a cross-sectional view of a portion of a liquid crystal diffractive lens according to an exemplary embodiment of the present invention and a view showing a voltage applied to an electrode of a liquid crystal diffractive lens, The liquid crystal diffractive lens according to the present exemplary embodiment is almost the same as the liquid crystal diffractive lens shown in FIG. 5 and FIG. 6, except for the structure of the first electrode layer 190.

The first electrode layer 190 of the present exemplary embodiment includes a first electrode array 191 including a plurality of first electrodes 194, an insulating layer 180 formed on the first electrode array 191, and a second electrode array 195 formed on the insulating layer 180 and including a plurality of second electrodes 198. The widths of the horizontal direction of the first electrode 194 and the second electrode 198 or the interval between the electrodes 194 or between the electrodes 198 is uniform regardless of the position of the zone or the sub-zones sZ1, sZ2, sZ3, and sZ4. The widths of the electrodes 194 and 198 may be the same as the interval between the electrodes 194 and between the electrodes 198. Also, the widths of the horizontal direction of the first electrode 194 and the second electrode 198 may be greater than or equal to the cell gap d of the liquid crystal layer 3.

In the present exemplary embodiment, the number of first electrodes 194 and second electrodes 198 included in the zones and sub-zones sZ1, sZ2, sZ3, and sZ4 of the zone plate is different according to the position of the zone. Referring to FIG. 10, each sub-zone sZ1, sZ2, sZ3, and sZ4 includes one first electrode 194 and one second electrode 198 in the (n−1)-th zone such that four first electrodes 194 and four second electrodes 198 in total are positioned in the (n−1)-th zone. Each sub-zone sZ1, sZ2, sZ3, and sZ4 in the n-th zone and the (n+1)-th zone includes one of the first electrode 194 or the second electrode 198 such that two first electrodes 194 and two second electrodes 198 are positioned in each of the n-th zone and the (n+1)-th zone. Each of the sub-zones sZ1, sZ2, sZ3, and sZ4 includes at least one of the electrodes 194 and 198, and the number of electrodes 194 and 198 included in each zone is gradually reduced toward the outside from the inside, however the number of first electrodes 194 and second electrodes 198 respectively included in some zones may be the same.

To realize the Fresnel zone plate in the present exemplary embodiment, the first electrode 194 or the second electrode 198 included in the same sub-zones sZ1, sZ2, sZ3, and sZ4 of each zone is applied with the voltage to generate the same phase delay. In each zone, as the sub-zones sZ1, sZ2, sZ3, and sZ4 are positioned further in the outer direction in each zone, the first electrode 194 and the second electrode 198 are applied with a higher voltage, such that the voltages applied to each zone and the accordant phase delay values of the liquid crystal layer 3 form the multi-level of the step type, like the previous exemplary embodiment.

According to the present exemplary embodiment, the widths and the intervals between the first electrodes 194 and between the second electrodes 198 are uniform such that the position of the Fresnel zone plate in the liquid crystal diffractive lens, or the position and the width of the zone of the Fresnel zone plate may be freely controlled, differently from the exemplary embodiment of FIG. 6. Accordingly, when it is applied to an image display device, the zone plate position in the liquid crystal diffractive lens may be shifted such that a time divisional scheme is possible. Accordingly, a region capable of being recognized in one vision field in one frame may be widened such that the resolution may be increased.

In addition to this, various characteristics and effects of the above exemplary embodiments of FIG. 5, FIG. 6, FIG. 7, FIG. 8 and FIG. 9 may be applied to the present exemplary embodiment.

Next, an image display device according to another exemplary embodiment of the present invention will be described with reference to FIG. 11.

Figure 11:
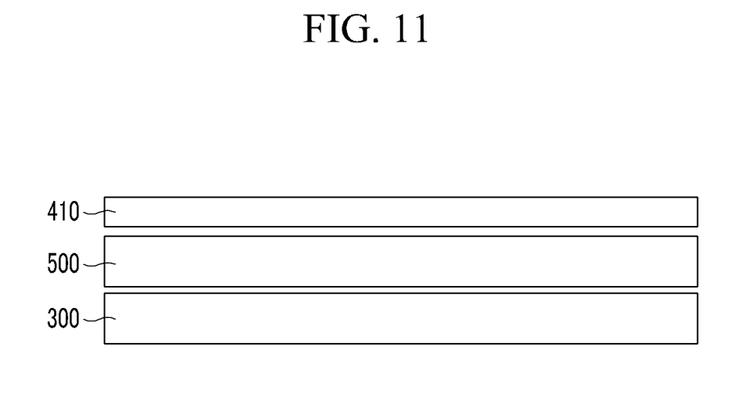
FIG. 11 is a cross-sectional view of an image display device of a polarization converting type according to an exemplary embodiment of the present invention.

FIG. 11 is a cross-sectional view of an image display device of a polarization converting type according to an exemplary embodiment of the present invention.

An image display device according to an exemplary embodiment of the present invention includes a display panel 300 displaying images, and a polarization switching unit 500 and an anisotropic diffractive lens 410 positioned on the front side of the surface where the images of the display panel 300 are displayed.

The display panel 300 is the same as that of the exemplary embodiment of FIG. 1 and FIG. 2 such that the detailed description is omitted.

The anisotropic diffractive lens 410 as the diffractive lens like the previously-described Fresnel zone plate has optical anisotropy such that the function of the Fresnel zone plate may be selectively switched on/off according to the polarization state of the incident light by the polarization switching unit 500. When the anisotropic diffractive lens 410 operates as the Fresnel zone plate, the display panel 300 displays the images in the 3D mode, and the anisotropic diffractive lens 410 divides the vision field of the displayed images such that the observer may recognize the 3D image. When the anisotropic diffractive lens 410 does not operate as the Fresnel zone plate, the display panel 300 displays the images in the 2D mode such that the observer may recognize the 2D image.

The polarization switching unit 500 may switch on and off the anisotropic diffractive lens 410 by controlling the polarization direction of the image from the display panel 300 to generate a phase delay in the anisotropic diffractive lens 410, thereby making the anisotropic diffractive lens 410 function as a Fresnel zone plate or to not generate the phase delay in the anisotropic diffractive lens 410, thereby not making the anisotropic diffractive lens 410 function as the Fresnel zone plate.

Thus, an exemplary embodiment of the anisotropic diffractive lens 410 will be described with reference to FIG. 12.

Figure 12:
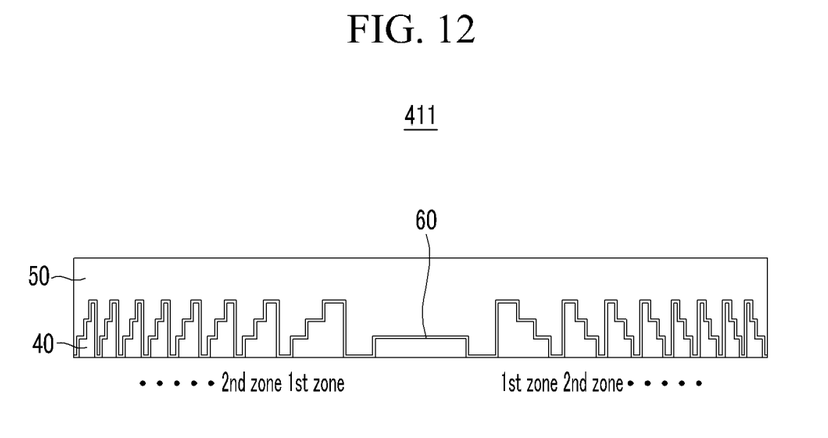
FIG. 12 is a cross-sectional view of an anisotropic diffractive lens of a film type as one example of an anisotropic diffractive lens included in an image display device of a polarization converting type of FIG. 11.

FIG. 12 is a cross-sectional view of an anisotropic diffractive lens of a film type as one example of an anisotropic diffractive lens included in an image display device of a polarization converting type of FIG. 11.

Referring to FIG. 12, an anisotropic diffractive lens 411 according to the present exemplary embodiment includes an isotropic diffractive film 50, an alignment layer 60 coated on one surface of the isotropic diffractive film 50, and an anisotropic material layer 40 positioned on the alignment layer 60.

The isotropic diffractive film 50 may be made of an organic material or an inorganic material having optical isotropic characteristics, and the cross-section coated with the alignment layer 60 has substantially the same shape as the phase change of the multi-level phase modulation zone plate described above. Accordingly, the anisotropic diffractive lens 411 has substantially the same phase delay as the phase change of the multi-level phase modulation zone plate. However, the cross-section of the isotropic diffractive film 50 may have the same shape as the phase change of the Fresnel zone plate of the above described several kinds of FIG. 4.

The anisotropic material layer 40 may be made of an optical anisotropic material such as a liquid crystal polymer material, and may be hardened by ultraviolet rays. When the anisotropic material layer 40 is made of the liquid crystal polymer material, the alignment layer 60 determines the alignment of the liquid crystal material in the step of forming the anisotropic material layer 40, and when using an anisotropic material of which the alignment is not necessary, it may be omitted. When the anisotropic material layer 40 is made of the liquid crystal polymer material, another alignment layer (not shown) may be further formed on the anisotropic material layer 40.

Next, another exemplary embodiment of the anisotropic diffractive lens 410 shown in FIG. 11 will be described with reference to FIG. 13.

Figure 13:
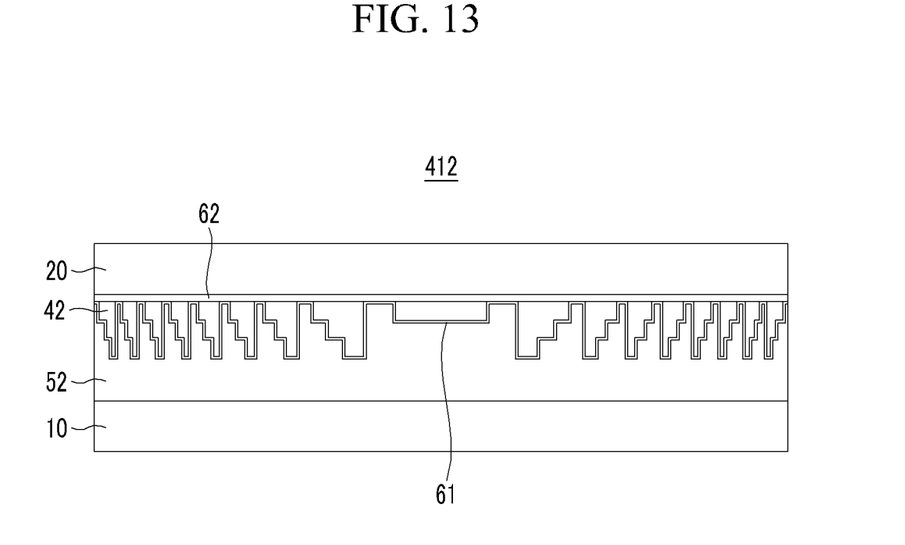
FIG. 13 is a cross-sectional view of an anisotropic diffractive lens of a liquid crystal cell type as one example of an anisotropic diffractive lens included in an image display device of a polarization converting type of FIG. 11.

FIG. 13 is a cross-sectional view of an anisotropic diffractive lens of a liquid crystal cell type as one example of an anisotropic diffractive lens included in an image display device of a polarization converting type of FIG. 11.

Referring to FIG. 13, an anisotropic diffractive lens 412 according to the present exemplary embodiment includes a first substrate 10 and a second substrate 20 facing each other, an isotropic diffractive layer 52 disposed between the two substrates 10 and 20, an alignment layer 61 coated on one surface of the isotropic diffractive layer 52, a liquid crystal layer 42 positioned on the alignment layer 61, and an alignment layer 62 coated between the liquid crystal layer 42 and the second substrate 20.

The shape of the upper surface of the isotropic diffractive layer 52 is formed to vary into the multi-levels like the phase variation of the above-described multi-level phase modulation zone plate, however in a region corresponding to each zone of the zone plate, the upper surface of the isotropic diffractive layer 52 has a height decreasing toward the center of the zone plate. Accordingly, the anisotropic diffractive lens 412 has substantially the same phase delay as the phase change of the multi-level phase modulation zone plate. However, the shape of the upper surface of the isotropic diffractive film 52 may have the same shape as the phase variation of the Fresnel zone plate of the above-described several kinds of FIG. 4.

The liquid crystal layer 42 is aligned in the direction determined by the alignment layers 61 and 62. The liquid crystal molecules of the liquid crystal layer 42 have a bar shape having a long axis and a short axis, and the optical characteristic have different anisotropy for the long axis direction and the short axis direction. That is, the liquid crystal molecules have different values of matter properties such as dielectric ratio, refractive index, electrical conductivity, and viscosity in the direction parallel to the long axis of the liquid crystal molecule and in the direction perpendicular to the long axis of the liquid crystal molecule. The anisotropic diffractive lens 412 may have the optical anisotropy by forming the liquid crystal layer 42 including such liquid crystal molecules.

Accordingly, the anisotropic diffractive lens 412 according to the present exemplary embodiment functions as the Fresnel zone plate according to the polarization direction of the incident light controlled by the polarization switching unit 500 of FIG. 11 such that the 3D image may be recognized, or it does not function as the Fresnel zone plate such that the 2D image may be recognized.

To simply describe a manufacturing method of the anisotropic diffractive lens 412, the isotropic diffractive layer 52 may be formed by depositing an organic material or an inorganic material having the optical isotropy on the first substrate 10 made of an insulating material and patterning the upper surface thereof. The alignment layer 61 is coated on the patterned isotropic diffractive layer 52, the first substrate 10 is combined with the second substrate 20 coated with the alignment layer 62, and then the liquid crystal layer 3 is injected between the two substrates 10 and 20, thereby completing the anisotropic diffractive lens 412.

As described above, according to the exemplary embodiments shown in FIG. 11, FIG. 12 and FIG. 13, the anisotropic diffractive lens is turned on/off by the polarization control of the polarization switching unit 500 such that the 2D/3D image conversion may be easy.

Also, the thickness of the anisotropic diffractive lens may be reduced, and the productivity of the diffractive lens may be improved.

Next, a driving method of an image display device including a diffractive lens 400 according to the several exemplary embodiments discussed above and a display panel 300 to display an image will be described with reference to FIG. 14 as well as FIG. 1 and FIG. 2.

Figure 14:
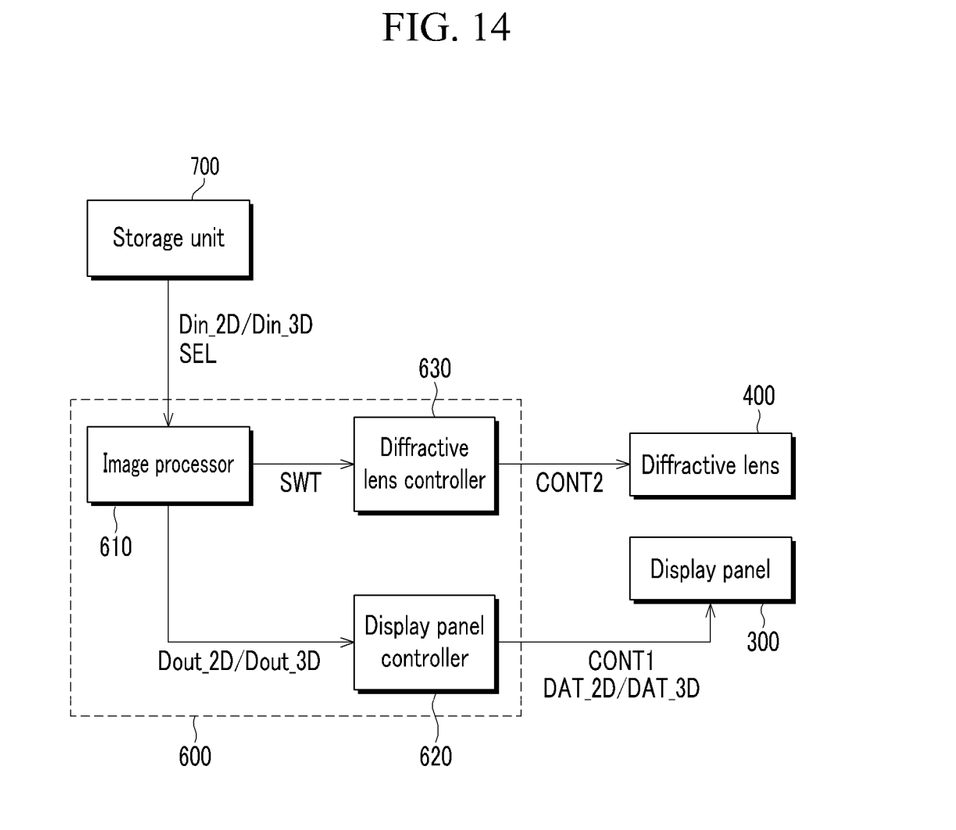
FIG. 14 is a block diagram of a driving method of an image display device according to an exemplary embodiment of the present invention.

FIG. 14 is a block diagram of a driving method of an image display device according to an exemplary embodiment of the present invention.

A storage unit 700 outside the image display device stores the 2D image information and the 3D image information, and may receive selection information determining which of the 2D image and the 3D image will be displayed. The storage unit 700 inputted with the selection information outputs a 2D image signal Din_2D or a 3D image signal Din_3D, and a selection signal SEL to a controller 600 of the image display device according to the selection information. The kind of the image signal output from the storage unit 700 may be determined as one such that the selection signal SEL may be omitted.

An image processor 610 of the controller 600 receives the 2D image signal Din_2D or 3D image signal Din_3D, and the selection signal SEL, and appropriately processes them, and transmits the processed 2D image signal Dout_2D or the processed 3D image signal Dout_3D to a display panel controller 620 and a switching signal Swt to a diffractive lens controller 630. The switching signal Swt is a signal for the on/off switching of the diffractive lens 400.

The diffractive lens controller 630 inputted with the switching signal Swt generates a diffractive lens control signal CONT2 to output it to the diffractive lens 400 of the image display device. The diffractive lens control signal CONT2 controls the switching on/off of the diffractive lens 400.

The display panel controller 620 having received the processed 2D image signal Dout_2D or the processed 3D image signal Dout_3D generates the display panel control signal CONT1 and the 2D image data DAT_2D or the 3D image data DAT_3D to output them to the display panel 300. The display panel control signal CONT1 controls whether the display panel 300 is operated in the 3D mode or the 2D mode.

The display panel 300 operates in the 2D mode or the 3D mode according to the display panel control signal CONT1. When the display panel 300 operates in the 2D mode, the 2D image data DAT_2D is displayed, and when operating in the 3D mode, the 3D image data DAT_3D is displayed.

The diffractive lens 400 is switched on/off according to the diffractive lens control signal CONT2. The diffractive lens 400 may be turned off when the display panel 300 is in the 2D mode and may be turned on when it is in the 3D mode, or vice versa. This may be determined according to the kind of diffractive lens 400.

According to an exemplary embodiment of the present invention, the cell gap of the liquid crystal layer included in the liquid crystal diffractive lens may be remarkably reduced such that the control of the liquid crystal molecules may be easy, and the surface of the substrate contacting the liquid crystal layer is substantially flat such that uniformity of alignment of the liquid crystal layer may be improved.

Also, the diffractive lens is formed by using the principle of the Fresnel zone plate such that the thickness of the diffractive lens may be further reduced, and in the case of the liquid crystal diffractive lens, the cell gap of the liquid crystal layer may be further reduced and the productivity of the diffractive lens included in the image display device may be improved.

While this invention has been described in connection with what is presently considered to be practical exemplary embodiments, it is to be understood that the invention is not is limited to the disclosed embodiments. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An image display device, comprising:
  a display panel to display an image; and
  a diffractive lens disposed on the display panel to modify a light path of the image,
  wherein the diffractive lens modifies the light path by operating as a Fresnel zone plate,
  wherein:
  the diffractive lens comprises:
    a first electrode layer disposed on a first substrate;
    a second electrode layer facing the first electrode layer; and
    a liquid crystal layer interposed between the first electrode layer and the second electrode layer;
  the first electrode layer comprises:
    a first electrode array comprising a plurality of first electrodes;
    an insulating layer disposed on the first electrode array; and
    a second electrode array comprising a plurality of second electrodes, the second electrode array being disposed on the insulating layer;
  the first substrate and the liquid crystal layer comprise a plurality of zones sequentially positioned toward an outside with reference to a center of the Fresnel zone plate diffractive lens;
  at least one of the zones comprises at least one of the first electrodes and at least one of the second electrodes; and
  a width of the first electrode or the second electrode is greater than or substantially equal to a cell-gap of the liquid crystal layer.

2. The image display device of claim 1, wherein voltages applied to the at least one first electrode and the at least one second electrode are varied gradually toward the center of the Fresnel zone plate diffractive lens in each zone.

3. The image display device of claim 2, wherein:
  each zone comprises at least one of the first electrodes and at least one of the second electrodes;
  each zone further comprises a plurality of sub-zones; and
  a voltage of the first electrode or the second electrode included in a same sub-zone in each of the plurality of zones is applied to generate a same phase delay of light transmitted through the liquid crystal layer.

4. The image display device of claim 3, wherein:
  each zone comprises at least one of the first electrodes and at least one of the second electrodes; and
  voltages applied to the first electrode or the second electrode included in a same sub-zone of different zones of the plurality of zones are substantially the same as each other.

5. The image display device of claim 4, wherein the first electrodes and the second electrodes are alternately disposed.

6. The image display device of claim 5, wherein:
  each zone comprises at least one of the first electrodes and at least one of the second electrodes; and
  at least one of a width of the first electrode and a width of the second electrode is decreased closer to an outer zone of the Fresnel zone plate diffractive lens.

7. The image display device of claim 6, wherein the second electrode layer is disposed on a second substrate facing the first substrate, the second electrode layer comprising a common electrode.

8. The image display device of claim 1, wherein:
each zone comprises at least one of the first electrodes and at least one of the second electrodes; and
voltages applied to the at least one first electrode and the at least one second electrode are varied gradually toward the center of the Fresnel zone plate diffractive lens in each zone.

9. The image display device of claim 8, wherein:
each zone comprises at least one of the first electrodes and at least one of the second electrodes;
each zone comprises a plurality of sub-zones; and
a voltage of the first electrode or the second electrode included in a same sub-zone in each of the plurality of zones is applied to generate a same phase delay of light transmitted through the liquid crystal layer.

10. The image display device of claim 9, wherein:
each zone comprises at least one of the first electrodes and at least one of the second electrodes; and
voltages applied to the first electrode or the second electrode included in a same sub-zone of different zones of the plurality of zones are substantially the same as each other.

11. The image display device of claim 10, wherein the first electrodes and the second electrodes are alternately disposed.

12. The image display device of claim 11, wherein:
each zone comprises at least one of the first electrodes and at least one of the second electrodes; and
at least one of a width of the first electrode and a width of the second electrode is decreased closer to an outer zone of the Fresnel zone plate diffractive lens.

13. The image display device of claim 12, wherein the second electrode layer is disposed on a second substrate facing the first substrate, the second electrode layer comprising a common electrode.

14. The image display device of claim 8, wherein:
each zone comprises at least one of the first electrodes and at least one of the second electrodes; and
voltages applied to the first electrode or the second electrode included in a same sub-zone of different zones of the plurality of zones are substantially the same as each other.

15. The image display device of claim 1, wherein:
each zone comprises at least one of the first electrodes and at least one of the second electrodes;
each zone further comprises a plurality of sub-zones; and
a voltage of the first electrode or the second electrode included in a same sub-zone in each of the plurality of zones is applied to generate a same phase delay of light transmitted through the liquid crystal layer.

16. The image display device of claim 15, wherein:
each zone comprises at least one of the first electrodes and at least one of the second electrodes; and
voltages applied to the first electrode or the second electrode included in a same sub-zone of different zones of the plurality of zones are substantially the same as each other.

17. The image display device of claim 16, wherein:
each zone comprises at least one of the first electrodes and at least one of the second electrodes; and
the first electrodes and the second electrodes are alternately disposed.

18. The image display device of claim 17, wherein:
each zone comprises at least one of the first electrodes and at least one of the second electrodes; and
at least one of a width of the first electrode and a width of the second electrode is decreased closer to an outer zone of the Fresnel zone plate diffractive lens.

19. The image display device of claim 18, wherein the second electrode layer is disposed on a second substrate facing the first substrate, the second electrode layer comprising a common electrode.

20. The image display device of claim 1, wherein:
each zone comprises at least one of the first electrodes and at least one of the second electrodes;
each zone further comprises a plurality of sub-zones; and
voltages applied to the first electrode or the second electrode included in a same sub-zone of different zones of the plurality of zones are substantially the same as each other.

21. The image display device of claim 20, wherein the first electrodes and the second electrodes are alternately disposed.

22. The image display device of claim 21, wherein:
each zone comprises at least one of the first electrodes and at least one of the second electrodes; and
at least one of a width of the first electrode and a width of the second electrode is decreased closer to an outer zone of the Fresnel zone plate diffractive lens.

23. The image display device of claim 22, wherein the second electrode layer is disposed on a second substrate facing the first substrate, the second electrode layer comprising a common electrode.

24. The image display device of claim 1, wherein the first electrodes and the second electrodes are alternately disposed.

25. The image display device of claim 24, wherein:
each zone comprises at least one of the first electrodes and at least one of the second electrodes; and
at least one of a width of the first electrode and a width of the second electrode is decreased closer to an outer zone of the Fresnel zone plate diffractive lens.

26. The image display device of claim 25, wherein the second electrode layer is disposed on a second substrate facing the first substrate, the second electrode layer comprising a common electrode.

27. The image display device of claim 1, wherein:
each zone comprises at least one of the first electrodes and at least one of the second electrodes; and
at least one of a width of the first electrode and a width of the second electrode is decreased closer to an outer zone of the Fresnel zone plate diffractive lens.

28. The image display device of claim 1, wherein the second electrode layer is disposed on a second substrate facing the first substrate, the second electrode layer comprising a common electrode.

29. The image display device of claim 1, wherein the cell-gap is less than about 5 um.

30. The image display device of claim 1, wherein:
each zone comprises at least one of the first electrodes and at least one of the second electrodes; and
at least one of a width of the first electrode and a width of the second electrode is uniform in all zones of the Fresnel zone plate diffractive lens.

31. The image display device of claim 1, wherein:
each zone comprises at least one of the first electrodes and at least one of the second electrodes; and
the first electrode, the second electrode, and the common electrode are applied with a same voltage such that the diffractive lens is turned off and a 2D image is recognized.

32. An image display device, comprising:
a display panel to display an image; and
a diffractive lens disposed on the display panel to modify a light path of the image,
wherein the diffractive lens modifies the light path by operating as a Fresnel zone plate, wherein the diffractive lens comprises:
a first electrode layer disposed on a first substrate, the first electrode layer comprising a plurality of first electrodes;
a second electrode layer facing the first electrode layer; and
a liquid crystal layer interposed between the first electrode layer and the second electrode layer,
wherein:
the first substrate and the liquid crystal layer comprise a plurality of zones sequentially positioned toward an outside with reference to a center of the Fresnel zone plate diffractive lens;
at least one of the zones comprises at least two of the first electrodes; and
a width of at least one of the two of the first electrodes is greater than or substantially equal to a cell-gap of the liquid crystal layer.

33. The image display device of claim 32, wherein the cell-gap is less than about 5 um.

34. The image display device of claim 32, wherein:
each zone comprises at least two of the first electrodes; and
voltages applied to the first electrodes are varied gradually toward the center of the Fresnel zone plate diffractive lens in each zone.

35. The image display device of claim 34, wherein:
each zone comprises at least two of the first electrodes;
each zone further comprises a plurality of sub-zones; and
a voltage supplied to the first electrode included in a same sub-zone in each of the plurality of zones is applied to generate a same phase delay of light transmitted through the liquid crystal layer.

36. The image display device of claim 34, wherein:
each zone comprises at least two of the first electrodes; and
voltages applied to the first electrode included in a same sub-zone of different zones of the plurality of zones are substantially the same as each other.

37. The image display device of claim 36, wherein a width of the first electrode is decreased as closer to an outer zone of the Fresnel zone plate diffractive lens.

38. The image display device of claim 37, wherein the second electrode layer comprises a common electrode.

39. An image display device, comprising:
a display panel to display an image; and
a diffractive lens disposed on the display panel to modify a light path of the image,
wherein:
the diffractive lens modifies the light path by operating as a Fresnel zone plate;
the diffractive lens comprises:
a first electrode layer disposed on a first substrate, the first electrode layer comprising a plurality of first electrodes;
a second electrode layer facing the first electrode layer; and
a liquid crystal layer interposed between the first electrode layer and the second electrode layer;
the diffractive lens comprises a plurality of zones sequentially positioned toward an outside with reference to a center of the Fresnel zone plate diffractive lens, the plurality of zones comprising a first zone and a second zone that are adjacent to each other and disposed at a same side with respect to the center of the diffractive lens;
each zone comprises at least two of the first electrodes;
each zone comprises a plurality of sub-zones; and
in a 3D mode, the diffractive lens is configured such that the first electrodes are supplied with voltages that are gradually varied toward the center of the diffractive lens in each of the first zone and the second zone, and a voltage applied to the first electrode in the first sub-zone of the first zone is substantially the same as a voltage applied to the first electrode in the first sub-zone of the second zone.

40. The image display device of claim 39, wherein a voltage supplied to the first electrode included in a same sub-zone in each of the plurality of zones is applied to generate a same phase delay of light transmitted through the liquid crystal layer.

41. The image display device of claim 40, wherein a width of the first electrode is decreased as closer to an outer zone of the Fresnel zone plate diffractive lens.

42. The image display device of claim 41, wherein the second electrode layer comprises a common electrode.

43. The image display device of claim 39, wherein a width of the first electrode is greater than or substantially equal to a cell-gap of the liquid crystal layer.

44. The image display device of claim 43, wherein the cell-gap is less than about 5 um.

* * * * *